(No Model.)

T. J. CAHILL.
DEVICE FOR REPAIRING SPUDS OF SANITARY CLOSET BOWLS.

No. 557,186. Patented Mar. 31, 1896.

Witnesses:
C. W. Graham
H. C. Cornelius

Inventor
Thomas J. Cahill
By W. E. Williams
Attorney.

UNITED STATES PATENT OFFICE.

THOMAS JOSEPH CAHILL, OF CHICAGO, ILLINOIS, ASSIGNOR TO LOUIS A. CORNELIUS, OF COOK COUNTY, ILLINOIS.

DEVICE FOR REPAIRING SPUDS OF SANITARY CLOSET-BOWLS.

SPECIFICATION forming part of Letters Patent No. 557,186, dated March 31, 1896.

Application filed August 20, 1894. Serial No. 520,797. (No model.)

*To all whom it may concern:*

Be it known that I, THOMAS JOSEPH CAHILL, a citizen of the United States, residing at Chicago, in the county of Cook and State of Illinois, have invented a new and useful Improvement in Devices for Repairing the Spuds of Sanitary Closet-Bowls, of which the following is a specification.

My invention is for the purpose of enabling repairs to be successfully made to the broken spuds of china closet-bowls; and it consists in the devices set forth in the claims hereof.

Reference will be had to the accompanying drawings, in which—

Figure 1:
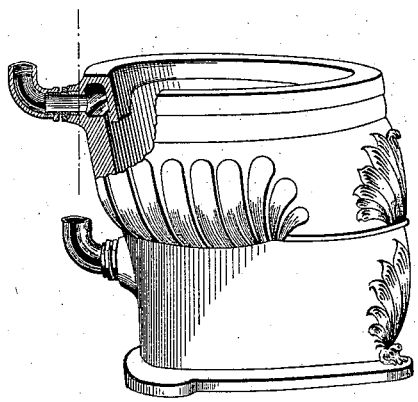
Figure 2:
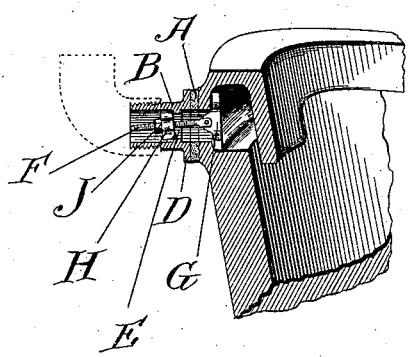
Figure 3:
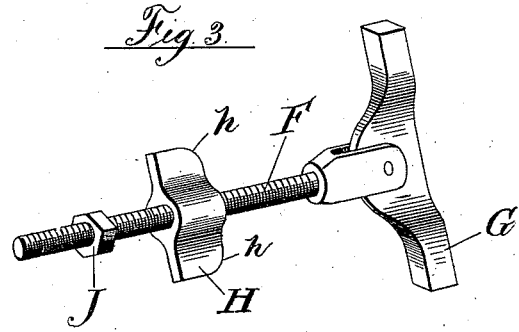
Figure 4:
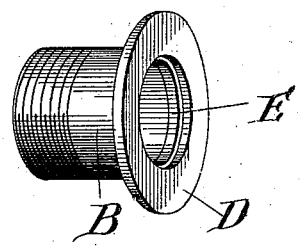
Figure 5:
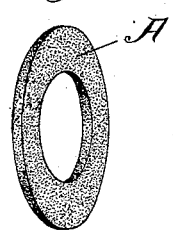

Figure 1 is a perspective view of a china bowl in common use, which is shown partly in section to show where the breaks most commonly occur. Fig. 2 is a sectional view of a part of a bowl, showing my device in position after the repairs have been made. Fig. 3 shows the stem, the pivoted toggle, and the flange-piece of my device. Fig. 4 shows the metallic nipple-piece of my device. Fig. 5 shows a rubber washer, such as is used with my device.

In the manufacture of china closet-bowls the practice is to mold the general form of the bowl in a plastic state, and then mold separately a small piece for the nipple or spud, and then plaster this piece to the body of the bowl, when the whole is then baked together.

To the china nipple the metallic pipe is attached by being cemented in, as shown in Fig. 1.

The dotted line in Fig. 1 shows about the line where the union of the nipple with the bowl was made in the plastic state, and it is along this line where the fractures more frequently occur.

My device for repairing a bowl broken as above described consists in a rubber washer A, a nipple B, which nipple has an outward-extending flange D and an inward-projecting flange E, and a stem F, in one end of which is pivoted cross-bar G and on which there slides a flange-piece H, which flange-piece has curved outward forward corners *h*, and the main portion of the stem is threaded, as shown, and is provided with a nut J.

To use the device, the nipple B and washer A are held in position, as shown in Fig. 2. Then the cross-bar G is turned on its pivot to a position approaching a parallel to the stem F, and the flange-piece H and nut J are run down to a point near the end of the stem, and then the stem with its cross-bar is entered in through the nipple and washer into the aperture of the bowl, and when at the proper place the bar G is again turned on its pivot and made to engage the sides of the aperture in a position best adapted to give a good bearing, and then the nut J is screwed up and thereby brings the flange-piece H in contact with the interior flange E of the nipple on which it bears, and thereby holds the nipple up against the washer and hence to the bowl, the rubber washer adjusting itself to the inequalities of the line of fracture of the bowl.

It does not often happen that the stem and cross-bar, when in position to give a good bearing upon which strains may be exerted, are in a central line to the nipple, and if they were required to be in a central line, because of the construction of the means of fastening the stem to the nipple, the device could seldom be used; but constructed as I show it the flange-piece H, having the rounded corners *h*, making, as it were, a ball-and-socket joint, may adjust itself in any position in the nipple against the inner flange E and at the same time give a good bearing to hold the nipple in place.

What I claim is—

1. In a device for the purpose described, the combination of a nipple-piece having an interior projecting flange, mechanism for holding said nipple in contact with the closet-bowl, which mechanism engages said flange and is adjustable to the angle of its bearing on said flange.

2. In a device for the purpose described, the combination of a nipple-piece having an interior projecting flange, of a stem having a pivoted cross-bar thereon and mechanism on said stem for engaging said flange which mechanism is self-adjustable in its bearing on said flange for the purpose described.

3. In a device for the purpose described the combination of a rubber washer, a nipple-piece having an exterior flange for engaging a rubber washer, and an interior flange for affording means for attaching the nipple to the closet-bowl, of mechanism for engaging the said nipple and holding the same in contact with a rubber washer and by it to the bowl, said mechanism adjustable in the angle of its bearing on said nipple.

4. In a device for the purpose described, the combination of a nipple-piece having an interior projecting flange, of a screw-threaded stem-piece, of mechanism pivoted to said stem-piece for engaging the closet-bowl, of a flange-piece on said stem-piece for engaging the interior flange of the nipple-piece, said flange-piece having rounded corners for the purpose described.

5. In a device for the purpose described, the combination of a nipple-piece, of a stem-piece for engaging the bowl and for holding said nipple-piece to said bowl, said stem-piece provided with mechanism for engaging said nipple-piece at different angles of bearing to suit the varying conditions of fracture of the bowl, substantially as described.

In witness whereof I have hereunto subscribed my name, on this 2d day of July, 1894, in the presence of two witnesses.

THOMAS JOSEPH CAHILL.

Witnesses:
H. C. CORNELIUS,
C. W. GRAHAM.